(12) United States Patent
Meador

(10) Patent No.: US 6,288,521 B1
(45) Date of Patent: Sep. 11, 2001

(54) INTELLIGENT POWER MANAGEMENT FOR RECHARGEABLE BATTERIES

(75) Inventor: James Chester Meador, Berkeley, CA (US)

(73) Assignee: STMicroelectronics, Inc., Carrollton, TX (US)

(*) Notice: Subject to any disclaimer, the term of this patent is extended or adjusted under 35 U.S.C. 154(b) by 0 days.

(21) Appl. No.: 09/657,563

(22) Filed: Sep. 8, 2000

(51) Int. Cl.$^7$ .................................................. H02J 7/00
(52) U.S. Cl. .............................................. 320/118; 320/124
(58) Field of Search .............................. 307/66, 64, 65; 320/118, 124, 136

(56) References Cited

U.S. PATENT DOCUMENTS

| | | | | |
|---|---|---|---|---|
| 5,656,915 | * | 8/1997 | Eaves ................................. | 320/118 |
| 5,666,006 | * | 9/1997 | Townsley et al. .................. | 320/124 |
| 5,739,596 | * | 4/1998 | Takizawa et al. .................. | 307/66 |
| 5,867,007 | * | 2/1999 | Kim ..................................... | 320/118 |
| 5,959,368 | * | 10/1999 | Kubo et al. ........................ | 307/18 |
| 6,060,864 | * | 5/2000 | Ito et al. ............................ | 320/136 |

* cited by examiner

Primary Examiner—Peter S. Wong
Assistant Examiner—Pia Tibbits
(74) Attorney, Agent, or Firm—Theodore E. Galanthay; Lisa K. Jorgenson; Daniel E. Venglarik

(57) ABSTRACT

An electronic device battery pack for a battery requiring cycling to prolong lifetime is divided into at least two parallel cells for which the charging state is automatically maintained. When external power is available and one or more cells is substantially discharged, the substantially discharged cell(s) are selected one at a time to be fully drained and recharged. A partially discharged but not substantially discharged cell will be left in that state until use of the electronic device has substantially discharged the cell. Once a cell has been recharged, the next substantially discharged cell is drained and recharged, and so on until all cells are fully charged. If the charging of a cell is interrupted by removal of the external power, another cell is utilized to provide power to the electronic device and recharging is resumed once the external power is restored. A device kept in a charging cradle except when being utilized may thus be used and returned to the charging cradle without adversely impacting battery life.

20 Claims, 1 Drawing Sheet

INTELLIGENT POWER MANAGEMENT FOR RECHARGEABLE BATTERIES

BACKGROUND OF THE INVENTION

1. Field of the Invention

The present invention relates to charging mechanisms for batteries and in particular to recharging batteries which must be substantially discharged before recharging.

2. Description of the Prior Art

A growing number of "cordless" or "mobile" electronic devices rely on rechargeable batteries rather than disposable batteries, including wireless telephones, laptops, personal digital assistants (PDAs), cordless telephones, etc. The devices typically utilize battery power when not connected to another power source, and recharge the battery when connected to an external power source through a charging cradle, power adapter, or the like.

In order to maximize useful lifetime, nickel-cadmium (NiCad) rechargeable batteries must be substantially discharged before being recharged. Although generally less expensive than "memory-free" rechargeable batteries such as nickel metal hydride (NiMH) or lithium ion (Li-Ion) batteries, the need for discharge prior to recharging has resulted in NiCad batteries finding less commercial acceptance than might be expected. A probable cause of this unpopularity is the hassle of trying to remember whether a battery has been discharged, or waiting until the battery has been discharged, before recharging.

Various charging schemes have been proposed for NiCad rechargeable batteries, each of which have proven less than satisfactory. For example, "flash" discharge mechanisms designed to quickly discharge a battery to an acceptable level before recharging have reduced the wait before a battery may be recharged, but can be only somewhat less harmful to battery life than recharging before complete discharge. Battery life is best when the battery is discharged utilizing a slow, controlled drain through a load.

It would be desirable, therefore, to provide a power management system for rechargeable batteries which intelligently controls discharge and recharging to extend battery life.

SUMMARY OF THE INVENTION

An electronic device battery pack for a battery requiring cycling to prolong lifetime is divided into at least two parallel cells for which the charging state is automatically maintained. When external power is available and one or more cells is substantially discharged, the substantially discharged cell(s) are selected one at a time to be fully drained and recharged. A partially discharged but not substantially discharged cell will be left in that state until use of the electronic device has substantially discharged the cell. Once a cell has been recharged, the next substantially discharged cell is drained and recharged, and so on until all cells are fully charged. If the charging of a cell is interrupted by removal of the external power, another cell is utilized to provide power to the electronic device and recharging is resumed once the external power is restored. A device kept in a charging cradle except when being utilized may thus be used and returned to the charging cradle without adversely impacting battery life.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

Figure 1:
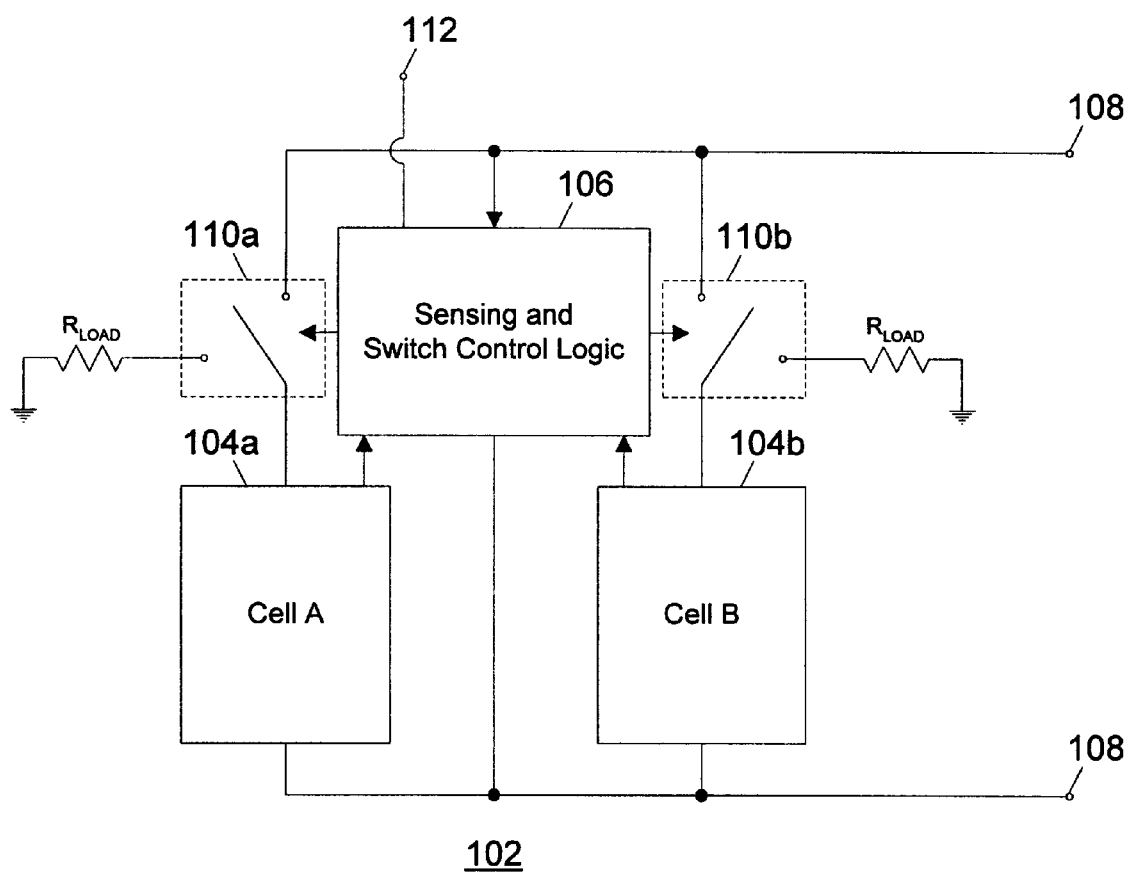
FIG. 1 depicts a circuit diagram for a power management system controlling use and charging of rechargeable batteries in accordance with a preferred embodiment of the present invention.

The following description details the structure, application and features of the present invention, but it will be understood by those of skill in the art that the scope of the invention is defined only by the issued claims, and not by any description herein.

With reference now to the figures, and in particular with reference to FIG. 1, a circuit diagram for a power management system controlling use and charging of rechargeable batteries in accordance with a preferred embodiment of the present invention is depicted. The power management system 102 depicted is especially useful for employing and recharging NiCad batteries, although the system may provide benefit for any type of rechargeable battery in which battery life is maximized through substantially full discharge prior to recharging.

Within power management system 102, the battery pack is structured to contain two discrete battery cells 104a and 104b, although the overall size and shape of the battery pack may be maintained in conformance with an existing design. Use and recharging of the two cells 104a and 104b is controlled by sensing and switch control logic 106, which may be integrated into the battery pack containing the two cells, or alternatively may be situated within the electronic device employing the battery pack or within a charging mechanism for the electronic device.

External power is supplied to the battery pack at contacts 108, which may also be employed to provide power to the electronic device from the battery pack. Logic 106 controls power transmitted to or drawn from cells 104a and 104b utilizing switches 110a and 110b, which may be transistors or networks of transistors and which preferably each include an open state in addition to a connection to contacts 108 and a connection to ground through resistor(s) $R_{LOAD}$. Logic 106 may optionally also receive a signal at contact 112 indicating whether the cells 104a and 104b are connected to an external power source, but preferably makes such a determination by the presence of a voltage or a load at contacts 108.

In operation, logic 106 controls power to and from cells 104a and 104b. When the battery pack being controlled is not connected to either an external power source or a load, logic 106 preferably maintains switches 110a and 110b in an open state. When connected to an external power source, logic 106 determines whether cells 104a and 104b are fully charged, partially charged (or partially discharged), substantially discharged, or fully discharged, which may be accomplished utilizing known circuits. If both cells are fully charged, logic 106 does nothing. If either cell 104a or 104b is not fully charged, however, logic 106 determines whether the respective cell has substantially discharged, and whether the respective cell has sufficiently discharged to permit that cell to be recharged with harming the life of that cell. If so, logic 106 connects that cell to the external power source to allow recharging of that cell. Various existing charging algorithms, such as those employing "flash" charging to a predetermined charge point followed by "trickle" charging for the remainder of the charging cycle, may be utilized.

If a cell 104a or 104b is only slightly discharged, the cell may be maintained in the partially discharged state until use of the electronic device drains the cell sufficiently to warrant a discharge/recharge cycle. The determination of whether a cell 104a or 104b is only "partially discharged," not warranting full discharge and recharging, or is "substantially discharged," warranting controlled discharge and recharging of the cell, is largely a matter of design choice depending upon the number of cells employed and the rate of expected power consumption by the electronic device. For example, a cell 104a or 104b may be considered only partially discharged as long as that cell retains at least half or one-third of the full charge. Alternatively, the length of time required to discharge and recharge the cell may be utilized by logic 106 to control discharge and recharge of cells.

Fully charged cells are left undisturbed by logic 106 when an external power source is connected to the battery pack and/or electronic device. Similarly, when a partially discharged cell 104a or 104b is encountered by logic 106, charging of that cell is not modified, and the cell is selected as a power source for the electronic device for subsequent use of the device when powered by the battery pack. Logic 106 undertakes to recharge a cell only when that cell is substantially or fully discharged.

If a substantially discharged cell has not yet discharged to a point at which recharging may be safely undertaken without harm to the lifetime of the battery pack, logic 106 connects that cell to a grounding contact through a resistive load $R_{LOAD}$, providing a slow, controlled drain rather than a flash discharge. If the electronic device is being utilized while connected to an external power source (other than the battery pack), the substantially discharged cell may be employed to provide power to the electronic device instead of powering the device from the external power source (although normal operation when both the battery pack and an external power source are present might utilize the external power source). Once the respective cell has discharged to a sufficient point to permit safe recharging, the cell is connected to the external power source and recharged.

If both cells 104a and 104b are substantially discharged when an external power source is connected to the electronic device, but not sufficiently discharge to permit safe recharging, logic 106 selects the cell with the least charge. The selected cell 104a or 104b is discharged through load $R_{LOAD}$ or the electronic device as described above, then recharged. Once the selected cell 104a or 104b is fully discharged and begun recharging, the other cell is then discharged through load $R_{LOAD}$ and/or the electronic device before recharging. Alternatively, discharge and recharge of both cells 104a and 104b may be concurrent and independent, with both cells discharging, one cell discharging and one recharging, or both cells recharging at any given time.

Preferably, however, only one cell 104a and 104b is discharged and recharged at any given time when the electronic device is connected to an external power source. If the external power source is disconnected before the selected cell has finished discharged and recharging, logic 106 remembers which cell was being discharged or recharged. Power to the electronic device is supplied from the other cell until that other cell is fully discharged. The cell which was only partially discharged or recharged is not utilized to power the electronic device unless the other cell is completely drained. Partially recharged cells (which have been fully discharged but not fully recharged) are employed only as a last resort to power the electronic device. Recharging of a partially recharged device is resumed whenever an external power source is available.

When the electronic device requires power and is not connected to an external power source, logic 106 selects either the cell which was not in the process of being discharged and recharged or, if neither cell was in the process of being discharged and recharged, the cell with the most remaining charge. If both cells 104a and 104b are fully charged, logic 106 selects either cell, preferably alternating which cell is selected each time both cells are found to be fully charged. When a selected cell is fully drained, the electronic device is switched to the other cell.

Although illustrated utilizing two discrete cells, the present invention may be readily extended and employed with three, four, or more discrete cells within the battery pack. The optimal number of cells will depend upon power consumption by the electronic device, charging times required, and expected usage (e.g., frequency of device use and subsequent return to a charging cradle).

The present invention splits the battery pack for an electronic device into separate, parallel cells and automatically maintains the state of charging among the cells. If both cells require recharging when the device is placed within the charging cradle (or otherwise connected to an external power source), one cell is selected for charging. If the electronic device is removed from the charging cradle for use before the selected cell has finished discharging or recharging, the other cell is utilized to provide power to the electronic device. In this manner, the electronic device may always be returned to the charging cradle after use. As a result, at least one cell should be fully charged at all times for a device which is generally kept in the charging cradle except for brief periods of use.

The present invention insures that at least one fully charged battery cell is always available, which means that the user is much less likely to exhaust the battery pack during a single call in the case of a cordless telephone handset or a wireless telephone. Proper cycling of batteries requiring cycling, such as NiCad batteries, is also insured, prolonging the useful life of the battery pack. The electronic device may be returned directly to the charging cradle after each use, allowing the location of the electronic device to always be known and avoiding the need for searching for the electronic device for the next use.

With the present invention, the user is not required to remember the state of battery charge before returning the electronic device to the charging cradle. The mechanism of the present invention may be built into the battery pack and/or retrofitted into existing devices without the need for any redesign of the charging system. No non-volatile memory storing the battery state is required since power is always available to the control logic from the battery cells.

While the invention has been particularly shown and described with reference to a preferred embodiment, it will be understood by those skilled in the art that various changes in form and detail may be made therein without departing from the spirit and scope of the invention.

What is claimed is:

1. A power system, comprising:
   at least two rechargeable battery cells constructed of a material requiring cycling to extend battery life and connected in parallel within a single battery pack;
   a connection port forming part of the battery pack and adapted to permit connection of the at least two battery cells to an external power source; and control logic forming part of the battery pack controlling charging of the at least two battery cells independently of any charging control logic outside the battery pack, wherein the control logic, when external power is available through the connection port, selects each of the at least two battery cells which requires recharging in turn, drains the selected battery cell, and recharges the selected battery cell, wherein each battery cell is independently selected, drained and recharged.

2. The power system of claim 1, wherein the at least two rechargeable battery cells further comprise:

two nickel cadmium battery cells.

3. The power system of claim 1, wherein the connection port comprises contacts within the battery pack containing the at least two battery cells.

4. The power system of claim 1, wherein the control logic, responsive to the external power being removed before a selected battery cell is recharged, provides power to an electronic device from another battery cell and resumes charging the selected battery cell once the external power is restored.

5. The power system of claim 1, wherein the control logic, responsive to external power being available when more than one battery cell is substantially discharged, selects a battery cell containing the least charge to be recharged first.

6. The power system of claim 1, wherein the control logic, responsive to a load being detected when external power is not available and when at least one battery cell is fully charged and at least one battery cell is partially discharged, selects the partially discharged battery cell to provide power.

7. The power system of claim 1, wherein the control logic attempts to maintain at least one of the battery cells in a fully charged state when external power is available.

8. A rechargeable battery, comprising:

a battery pack containing two rechargeable battery cells connected in parallel and including contacts for connection to an external power source and a load; and control logic within the battery pack and controlling charging of the at least two battery cells independently of any charging control mechanisms external to the battery pack, wherein the control logic alternates between the two battery cells during recharging to attempt to maintain at least one battery cell available to provide power to the load when recharging of the other battery cell is incomplete.

9. The rechargeable battery of claim 8, wherein the battery pack contains two nickel cadmium battery cells.

10. The rechargeable battery of claim 8, wherein the control logic selects each substantially discharged battery cell requiring recharging in turn and drains and recharges the selected battery cell independent of other battery cell.

11. The rechargeable battery of claim 8, wherein the control logic selects a partially discharged but not substantially discharged battery cell to provide power to the load over a fully charged battery cell.

12. The rechargeable battery of claim 8, wherein the control logic controls the battery pack to provide power to the load after external power is removed using a battery cell other than a battery cell which was being recharged immediately prior to removal of the external power.

13. The rechargeable battery of claim 8, further comprising:

switches between each of the battery cells and at least one contact for connection to an external power source and at least one contact for connection to a load, wherein the switches are controlled by the control logic.

14. A method for recharging a battery, comprising:

connecting a plurality of battery cells in parallel within a single battery pack with a common set of contacts for connection to an external power source and a load;

detecting when external power is available to the battery pack;

responsive to detecting that external power is available to the battery pack when at least one battery cell is substantially discharged, and independently of any charging control mechanism external to the battery pack:

sequentially selecting each substantially discharged battery cell, and recharging the selected battery cell without concurrently draining or recharging any other battery cell within the plurality of battery cells.

15. The method of claim 14, wherein the step of connecting a plurality of battery cells in parallel with a common set of contacts for connection to an external power source and a load further comprises:

connecting a plurality of nickel cadmium battery cells in parallel.

16. The method of claim 14, wherein the step of sequentially selecting each substantially discharged battery cell further comprises:

selecting a battery cell containing a least amount of charge first.

17. The method of claim 14, wherein the step of recharging the selected battery cell without concurrently draining or recharging any other battery cell within the plurality of battery cells further comprises:

prior to recharging the selected battery cell, draining the selected battery cell without concurrently draining or recharging any other battery cell within the plurality of battery cells.

18. The method of claim 14, further comprising:

responsive to detection of a load connected to the battery pack when external power is not available, selecting a partially discharged but not substantially discharged battery cell from the plurality of battery cells to provide power to the load rather than any fully charged battery cell.

19. The method of claim 14, further comprising:

responsive to detection of a load connected to the battery pack when external power is removed prior to complete recharging of a selected battery cell, providing power to the load from a battery cell other than the selected battery cell.

20. The method of claim 14, further comprising:

responsive to detecting external power being removed prior to complete recharging of a selected battery cell, providing power to the load from a battery cell other than the selected battery cell; and responsive to detecting external power being restored after the removal of the external power, completing the recharging of the selected battery cell.

* * * * *